No. 615,373. Patented Dec. 6, 1898.
E. A. TRAPP.
TRANSPORTATION CAR.
(Application filed Sept. 28, 1897.)
(No Model.) 6 Sheets—Sheet 1.
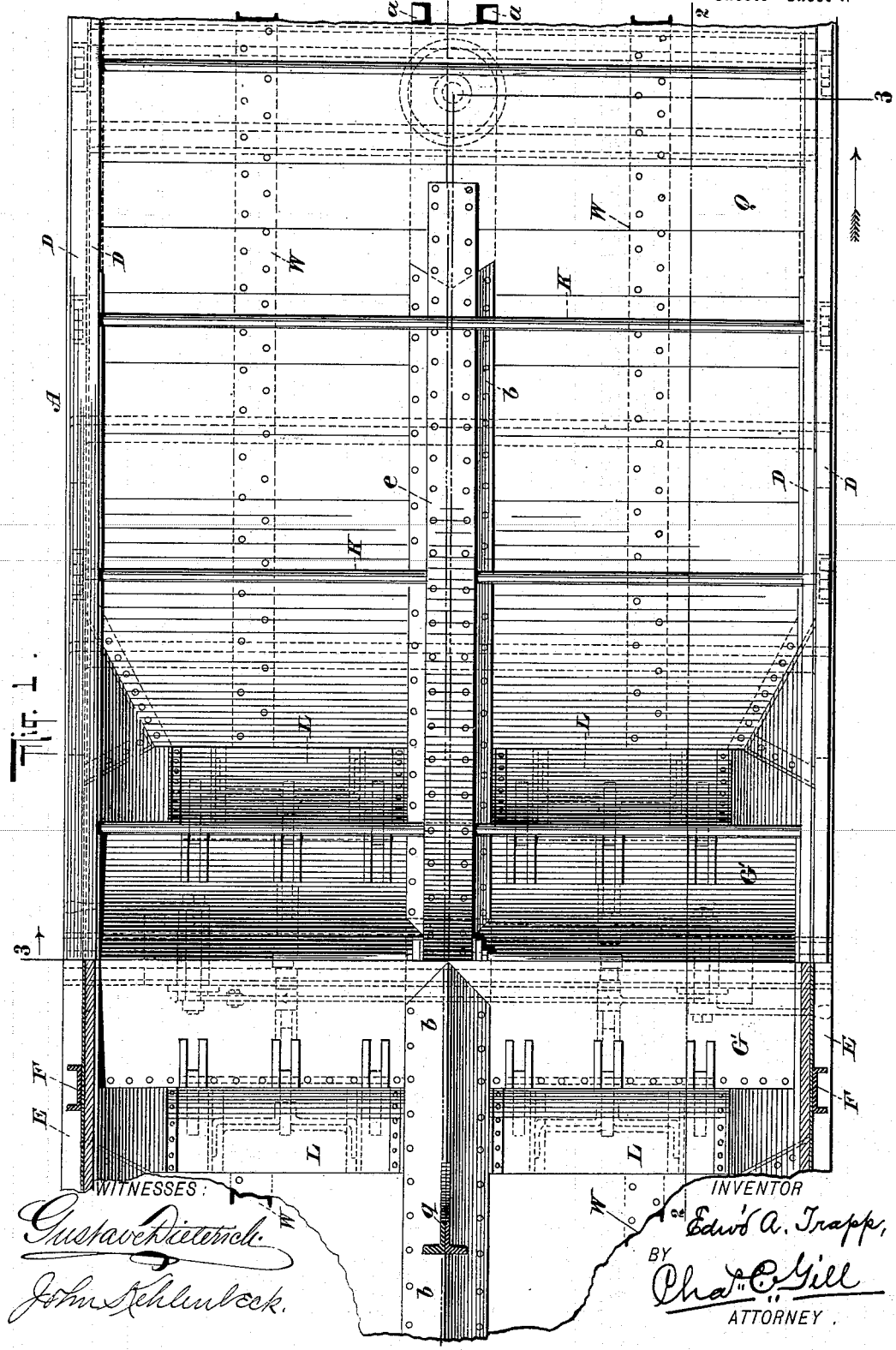

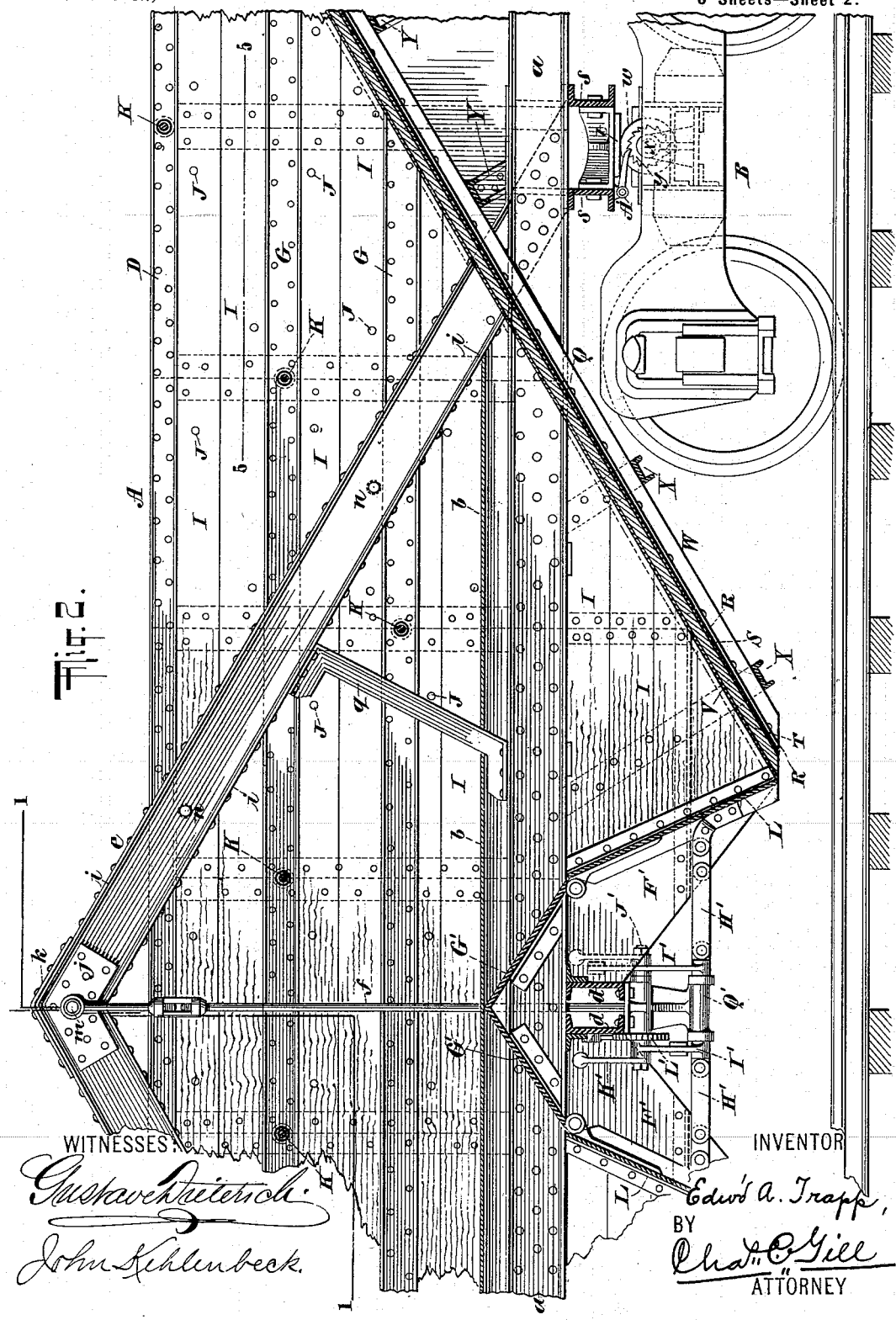

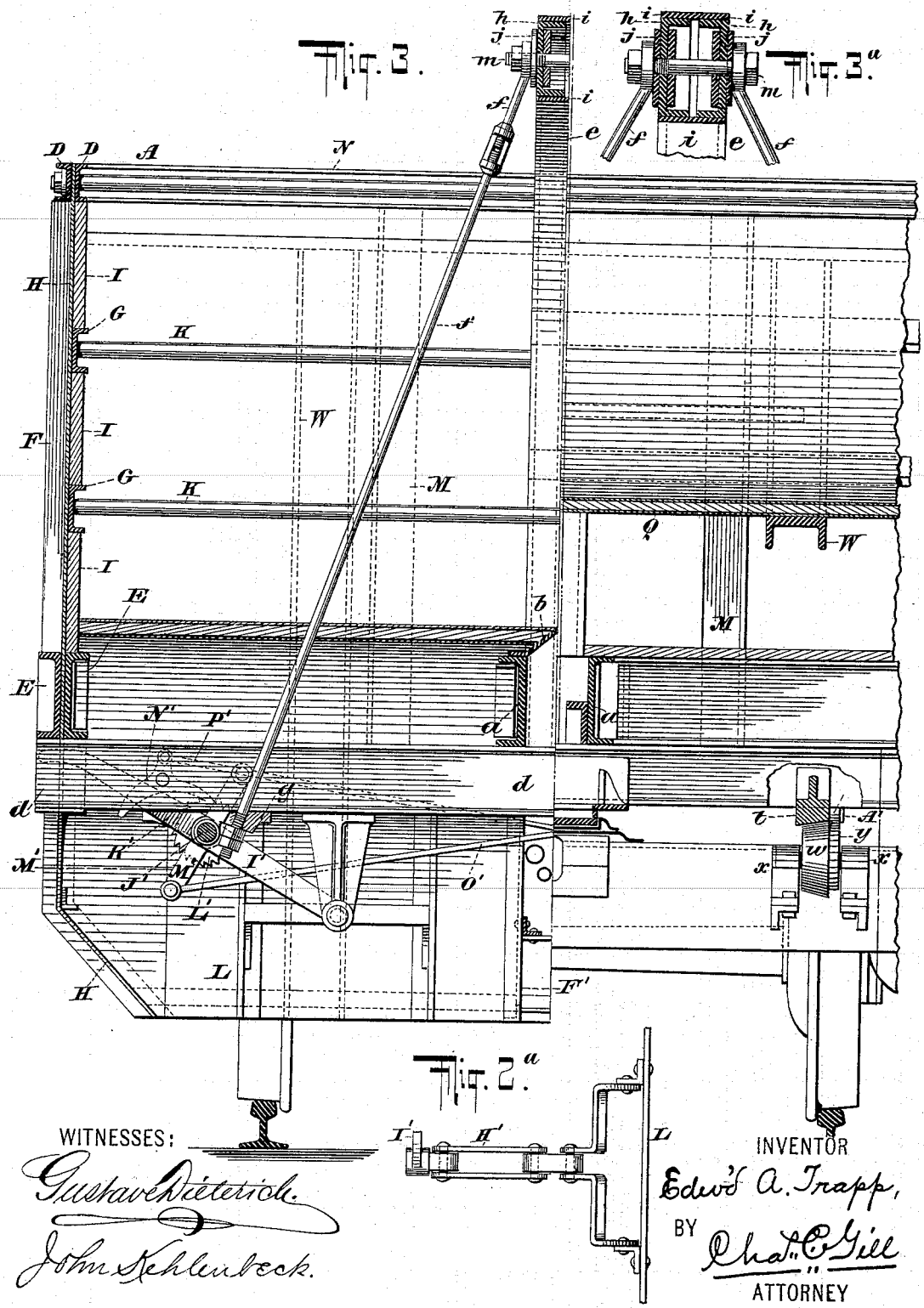

No. 615,373. Patented Dec. 6, 1898.
E. A. TRAPP.
TRANSPORTATION CAR.
(Application filed Sept. 28, 1897.)
(No Model.) 6 Sheets—Sheet 4.
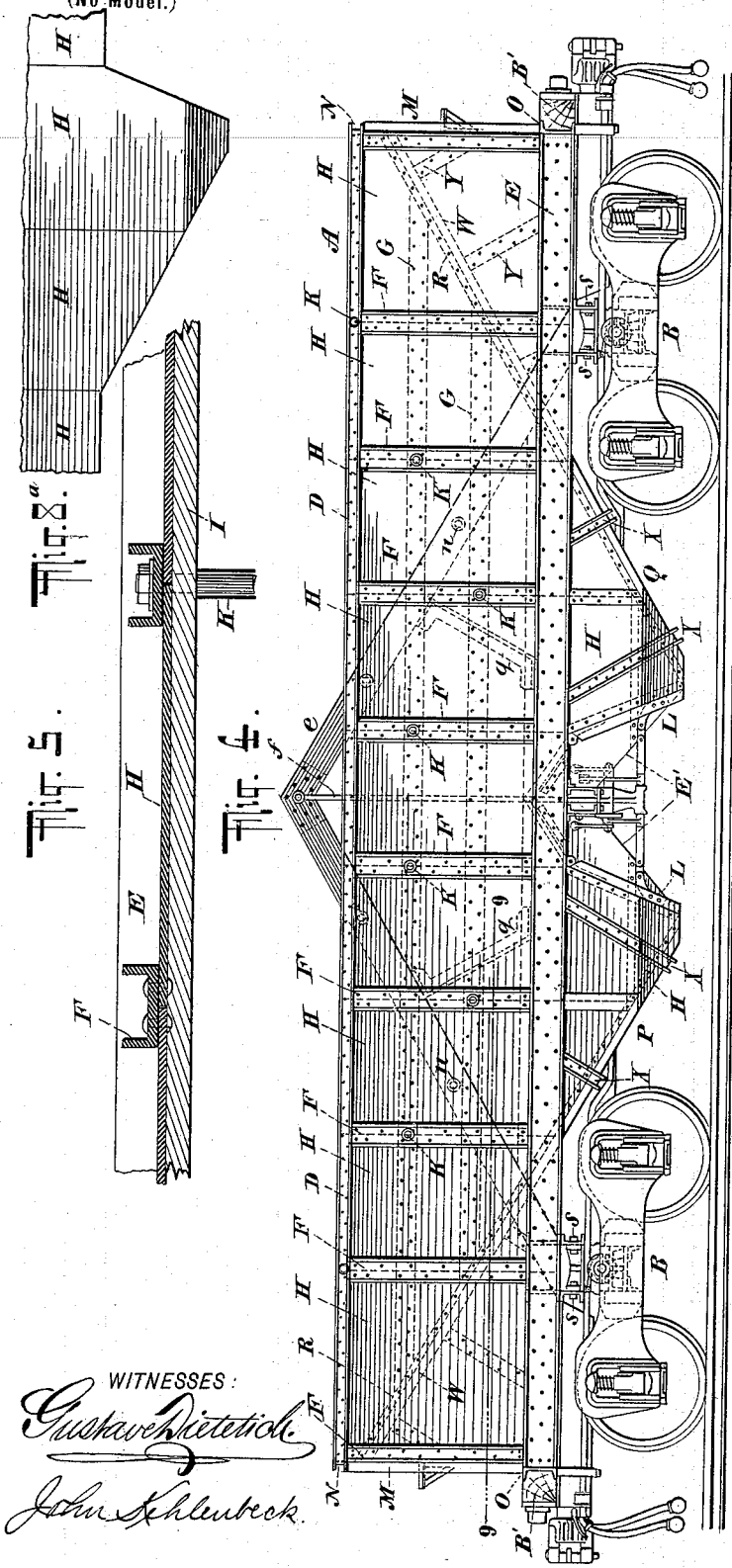
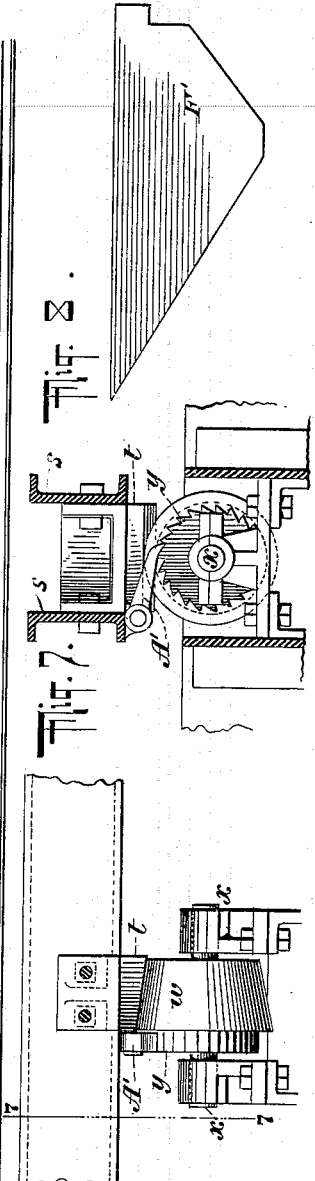
WITNESSES:
Gustave Dieterich
John Khlenbeck
INVENTOR
Edw'd A. Trapp,
BY
Chas. C. Gill
ATTORNEY No. 615,373. Patented Dec. 6, 1898.
E. A. TRAPP.
TRANSPORTATION CAR.
(Application filed Sept. 28, 1897.)
(No Model.) 6 Sheets—Sheet 5.
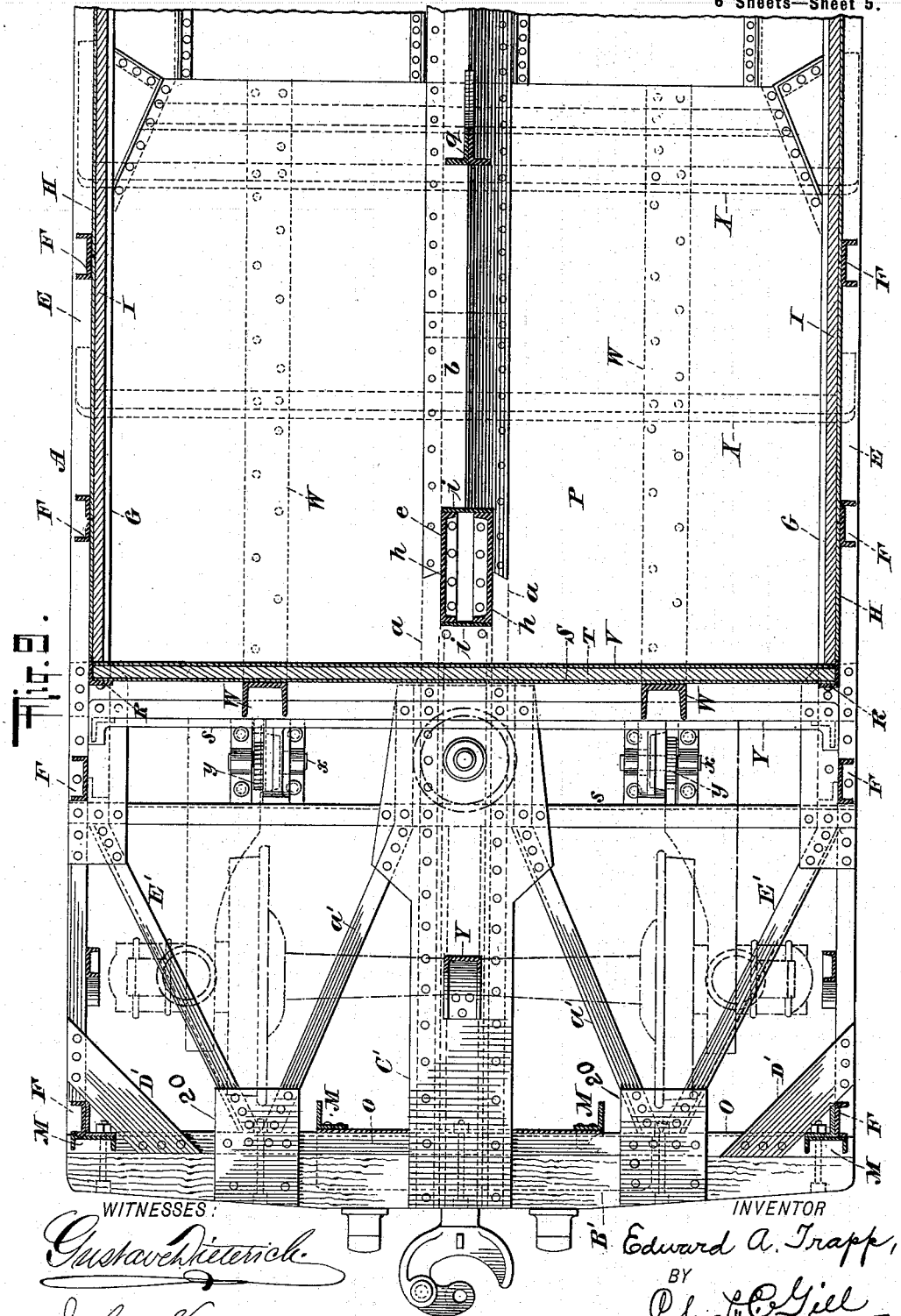

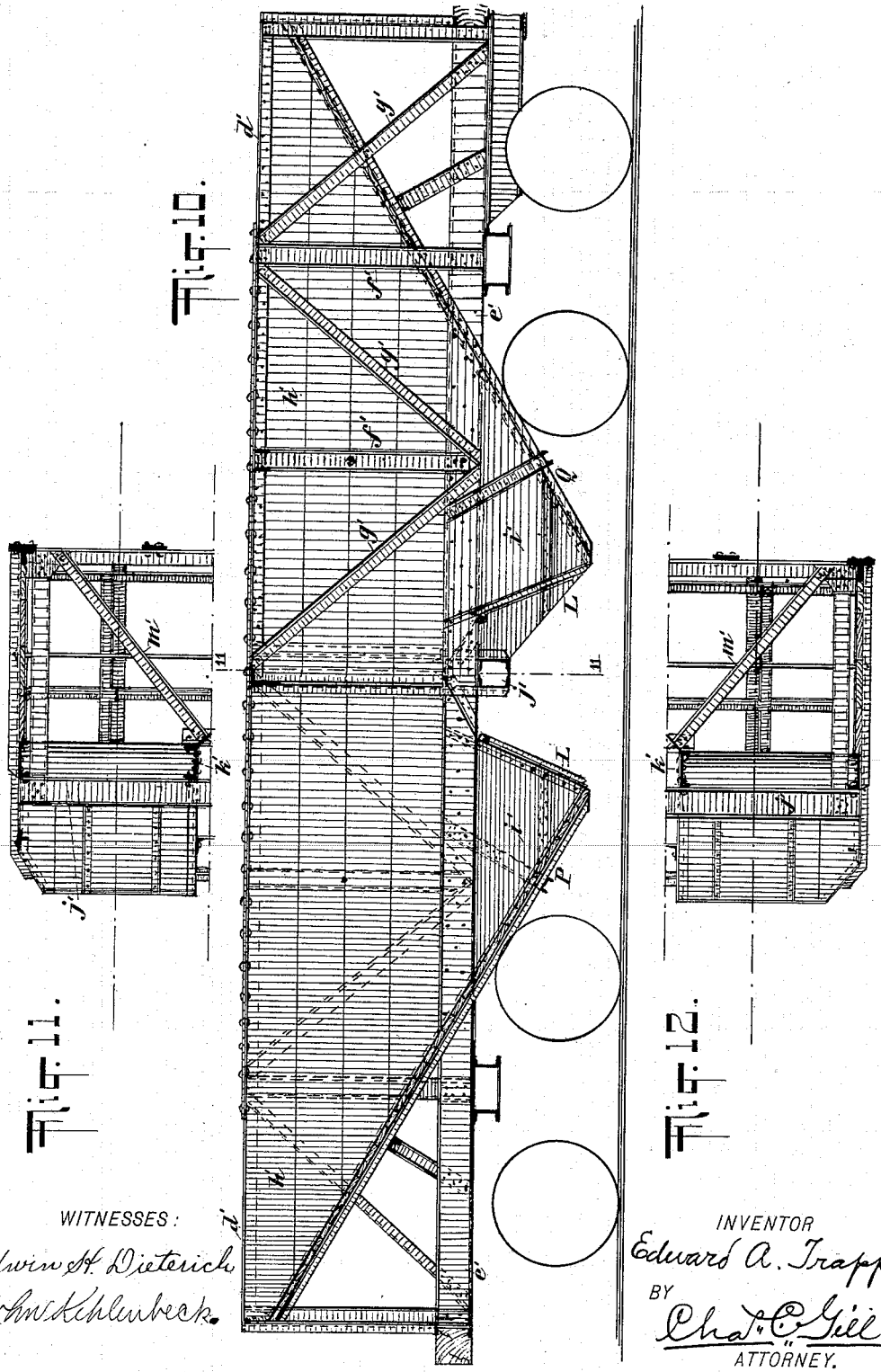

UNITED STATES PATENT OFFICE.

EDWARD A. TRAPP, OF NEW YORK, N. Y.

TRANSPORTATION-CAR.

SPECIFICATION forming part of Letters Patent No. 615,373, dated December 6, 1898.

Application filed September 28, 1897. Serial No. 653,313. (No model.)

*To all whom it may concern:*

Be it known that I, EDWARD A. TRAPP, a citizen of the United States, residing at New York, in the county of New York and State of New York, have invented certain new and useful Improvements in Transportation-Cars; and I do declare the following to be a full, clear, and exact description of the invention, such as will enable others skilled in the art to which it appertains to make and use the same, reference being had to the accompanying drawings, and to the letters and numerals of reference marked thereon, which form a part of this specification.

The invention relates to improvements in transportation-cars, and particularly to improvements in the class of cars employed for the transportation of coal, ore, and other materials.

The object of the invention is to produce a car of great carrying capacity and one capable of withstanding more than the weight of any load that may be placed within the same.

The car constructed in accordance with the present invention is wholly or largely of steel, and the parts of the car have been specially designed and constructed with the view of sustaining great weight and of avoiding all danger of the car collapsing or breaking down under the weight carried or by the constant hammering or jarring to which cars are subjected when in service.

In illustrating my invention I present in the drawings forming a part of this application a car having its floor in two main downwardly and inwardly inclined sections leading to discharge-doors and in which car the weight of the load is sustained by suitable trusses. By means of my invention the car-body may be constructed wholly of steel and safely made to carry any load that the axles could possibly sustain. The car illustrated is of great capacity and easily capable of sustaining several times the weight of any load that could be placed within the same.

The nature and objects of the invention and the purposes of the various parts of the structure will be pointed out in full hereinafter.

Referring to the accompanying drawings, Figure 1 is a top view of a portion of a car constructed in accordance with and embodying the invention, this figure being partly in section on the dotted line 1 1 of Fig. 2 and broken away at its ends. Fig. 2 is a vertical longitudinal section, partly broken away, through a car constructed in accordance with and embodying the invention, the section being on the dotted line 2 2 of Fig. 1. Fig. 2ª is a detached top view of one of the discharge-doors and a part of the lever mechanism for operating the same. Fig. 3 is a transverse section of the car on the dotted line 3 3 of Fig. 1. Fig. 3ª is a central transverse vertical detached section through the upper part of the main truss. Fig. 4 is a side elevation of a complete car embodying the invention. Fig. 5 is an enlarged detached longitudinal section through a portion of one side of the car and illustrating the wood lining for the same. Fig. 6 is a detached elevation of a portion of the car and showing more particularly the side bearing employed intermediate the bottom of the car and the transom of the truck. Fig. 7 is a vertical section of same on the dotted line 7 7 of Fig. 6. Fig. 8 is a detached plan view of one of the sheets of steel used to form the inner vertical side of the pockets at the discharge portion of the car-body. Fig. 8ª is a like view, partly broken away, of a portion of some of the plates forming the outer side of the car-body. Fig. 9 is a horizontal longitudinal section through a portion of the car on the dotted line 9 9 of Fig. 4. Fig. 10 is a side elevation, partly in section, of a modified form of car embracing some of the features of the invention; and Figs. 11 and 12 together constitute a vertical transverse section of same on the dotted line 11 11 of Fig. 10.

In the drawings, A designates the car-body as an entirety, and B B the usual car-trucks supporting said body, said trucks being of any suitable general construction.

Referring to the car shown in Figs. 1 to 9, inclusive, the sides of the car-body A correspond with one another, and said sides comprise at their upper edge the channel-beams D D, at their lower edge the channel-beams E E, the exterior vertical channel-beams F, the interior longitudinal channel-beams G, and the series of vertical metal plate-sections H, as more clearly illustrated in Figs. 3 and 4. The upper channel-beams D D face with their webs toward one another, as illustrated in Fig. 3, and the upper edges of the sheet-steel sections H are riveted between them, and the lower channel-beams E E face with their webs toward one another, as illustrated in Fig. 3, and have secured between them the lower portions of the sheet-steel sections H. The vertical channel-beams F extend between the upper and lower beams (lettered D E, respectively) and cover the joints between the sheet-steel sections H, the latter at their vertical edges being riveted to the webs of said vertical channel-beams F. The longitudinal beams G are at the inner side of each side of the car-body, and they are riveted through their web portion to the sheet-steel sections H and extend, as indicated in Fig. 4, from the inclined floor at one end of the car to the inclined floor at the other end of the car, said floors, as indicated, converging downward toward the center of the car and being described hereinafter.

At the inner side of each side of the car-body is provided, by preference, the lining I, of wood, this lining being composed of planking extending lengthwise of the car and between the inner longitudinal channel-beams G and beams D E, as illustrated in Figs. 2, 3, 5, and 9. The planks composing the wood lining I protect the inner faces of the sheet-steel sections H and receive support from the inner longitudinal channel-beams G, and they are also secured by means of occasional bolts J, (indicated in Fig. 2,) which pass through the planking and steel sections H. The opposite sides of the car are connected and strengthened by transverse rods K, which extend across the car-body and through the beams F G and plates H and are provided with the usual heads and nuts at their ends, whereby they are retained in position, as indicated in Figs. 1, 3, 4, and 5. The sheet-steel sections H extend vertically from the upper edge of the car-body to the lower edge of the same, the two end sections H at each end of the side of the car-body extending from the upper edge of the channel-beams D to the lower edge of the channel-beams E, while the two sections H at each side of the middle section H extend downward below the lower edge of the channel-beams E and have the inclined lower edges outlined in Figs. 3, 4, and 8$^a$. The middle section H extends from the upper edge of the beams D only to the lower edge of the beams E, and thus between the lower facing edges of those portions of the two sections H immediately adjoining the opposite sides of the said middle section H is left a space within which the discharge-doors L L may be operated by suitable lever mechanism, which will be hereinafter referred to.

The frame ends of the car-body are composed of vertical beams M M M and transverse channel-beams N O, the latter being at the upper and lower edges, respectively, of the ends of the car-body, and the said vertical beams being at and intermediate the opposite vertical edges of said ends.

The car-body in its preferred form has its floor made in two downwardly and inwardly converging floor-sections,(lettered P Q,) which extend downward from a point adjacent to the upper edge of the ends of the car-body and terminate at their lower ends at the doors L L, said floor-sections P Q being thus inclined to permit of an automatic discharge of the coal, ore, or other material being carried from the car. The floor-sections P Q correspond with one another, and they are secured in place between the sides of the car-body upon the angle-irons R, which are riveted, as shown in Fig. 4, to the sides of the car-body and have upon their transverse flanges the sheet-steel plates S, upon which is placed the wood planking T, covered by metal plates V, the plates V and planking T being preferably secured together and requiring no special means securing the same to the steel plates S, which are secured to the transverse flanges of the angle-irons R. The angle-irons R where they meet the inner channel-beams E will be made in sections, so as not to interfere with or necessitate the cutting of said beams E. In other words, the angle-irons R will extend down to the upper flange of the beams E and below the lower flange of said beams E, and between the two flanges of said beams E will be riveted a short section of the angle-irons, as denoted by dotted lines in Fig. 4, and in this manner the angle-irons R are conveniently made to pass said beams E. Upon the lower side of the floor-sections P Q and extending lengthwise of the same are the channel-beams W, whose web-surfaces are directly riveted to the steel plates S, forming a part of the floor-sections P Q, and the said floor-sections P Q are further secured in position by means of the bent channel-iron loops or hangers X and bent channel-iron supports Y, the loops or hangers X forming, substantially, stirrups which pass around the said floor-sections P Q and have their end portions riveted to portions of the steel sections H which project below the lower channel-beams E. The bent channel-iron supports Y Y are at the outer portions of the floor-sections P Q, as shown in Figs. 2 and 4, and they extend upward in the form of inverted stirrups against the floor-sections P Q, their depending ends being secured to the end steel sections H.

Intermediate the lower channel-beams or chords E and in line therewith are secured at opposite sides of the longitudinal central line of the car the channel-beams $a\,a$, whose flanges turn outward from one another and which by extending the full length of the car-body pass through the floor-sections P Q, and within the car-body, intermediate the points where they pass through the floor-sections P Q, said channel-beams $a\,a$ are provided upon their upper surfaces with the inclined roof $b$, which prevents the coal or ore from passing between or lodging upon said channel-beams $a\,a$. The inclined roof $b$ is of sheet metal, riveted at its edges to the upper flanges of the channel-beams $a\ a$, and its outline is clearly illustrated in Figs. 1, 2, 3, and 9. The central portions of the channel-beams $a\ a$ are directly supported upon the parallel rolled beams $d\ d$, extending transversely across the car-body directly below the said channel-beams $a\ a$ and also directly below the lower channel-beams or chords E E, as shown in Figs. 2 and 3. The parallel transverse rolled beams $d\ d$ receive their main support from the truss $e$ and truss-rods $f$, the latter extending downward from the upper end of said truss $e$ and passing between the beams $d$ and through bearing-blocks $g$ below said beams $d$. The lower ends of the truss-rods $f$ are provided with suitable nuts, as shown in Fig. 3, which are capable of being tightened against the transverse bearing-block $g$. The rods $f$ extend downward one upon each side of the truss $e$ and incline outward toward the end portions of the beams $d$. The truss $e$ is formed of the two downwardly-diverging parts or sections which terminate over the center bearings of the truck-frames, and said sections of said truss pass directly between and are riveted to the longitudinal channel-beams $a\ a$, Fig. 2, above referred to, which beams $a\ a$ are only separated a sufficient distance to permit the passage between them of the sections of the truss $e$, and said truss $e$ has each of its sections formed of two corresponding channel-beams $h\ h$, whose flanges turn toward one another and have secured to them the exterior plates $i\ i$, which in width correspond with the combined width of the upper and lower edges of the channel-beams $h\ h$. The upper ends of the sections of the truss $e$ meet, as shown in Fig. 2, and the sides of said sections at their meeting-point are secured together by side plates $j$ and an additional top plate $k$, Fig. 2, whereby said joint is rendered entirely secure and durable. The upper ends of the truss-rods $f$ are secured upon the bolt $m$, which passes through the plates $j$. The channel-beams $h\ h$ will preferably be connected by bolts $n$, as shown in Fig. 2, which bolts will preferably have upon them the usual sleeves, as indicated by dotted lines in Fig. 2, which operate to space the beams $h\ h$ and prevent their being crowded unduly toward one another. The sections of the truss $e$ in addition to being secured at their lower ends between the beams $a\ a$ may be further secured by means of suitable braces $q$, which extend upward from the upper surfaces of the beams $a\ a$ to the lower surfaces of said truss-sections, as indicated by dotted lines in Fig. 4 and by full lines in Fig. 2.

The longitudinal beams $a\ a$ and the longitudinal beams or chords E E are supported at their center, as above described, upon the parallel beams $d\ d$, extending transversely at the center of the car-body, and said beams $a\ a$ and E E are further supported upon the transverse channel-beams $s\ s$, which are suitably spaced and are directly over the center bearings of the car-trucks B B. The channel-beams $s\ s$ constitute suitable bolsters and are centrally over the car-trucks, and said beams $s\ s$, as more clearly illustrated in Figs. 6 and 7, carry the rub-irons $t$, which have a lower inclined edge contacting directly with the periphery of the tapered roller $w$, one of the latter being provided at each side of each truck and having its tapered surfaces converging to a central point of the truck. The tapered rollers $w$ constitute side bearings and are mounted in suitable journals $x$, supported from the truck-frame. Upon the outer face of each tapered roller $w$ is provided the ratchet-wheel $y$, adapted to be engaged by the pawl A', pivotally secured to the plate $t$ or to any suitable part of the bolster-beams $s$. The purpose of the pawl A' and ratchet $y$ is to effect the rotation of the rollers $w$ in order that during the use of the car fresh surfaces of the rollers may be constantly brought upward for contact with the plates $t$. When the car is upon a straight track, there will be little or no revoluble motion imparted to the roller side bearings $w$; but during the usual motions imparted to the car-body when the trucks are passing curvatures in the tracks the pawl A' will be acted upon to move the ratchet $y$ and through said ratchets the roller side bearings $w$, whereby fresh surfaces of the latter will be brought upward for contact with the plates $t$ and the latter will be prevented from wearing flat surfaces upon said rollers $w$. The bolster-beams $s\ s$ may be modified as to their form and construction at will.

The extreme ends of the longitudinal beams $a\ a$ and outer beams E E are connected together within a frame at each end of the car-body, as illustrated more clearly in Fig. 9. At the extreme ends of the beams $a\ a$ and E E are the transverse channel-beams O, forming the lower boundary of the ends of the car, and within each of the channel-beams O is set the wooden beam B', to which the buffers are secured and which by the plate C' is connected with the channel-beams $a\ a$. The end channel-beam O is connected with the side beams E E by means of suitable plates D' and also by means of the angle-irons E', and said beam O is connected with the plate C' by means of angle-irons $a'$. The outer or adjoining ends of the angle-irons E' and $a'$ are secured to connecting-plates 20 20, as shown in Fig. 9, which plates are secured to the beams O and B' by bolts or rivets. The inner channel-beams E terminate at the inner ends of the angle-irons E'.

The longitudinal channel-beams $a\ a$ between the inclined floors P Q have secured to them by riveting the vertical plates F', of the form more clearly indicated in Fig. 8, and which extend downward from said longitudinal beams $a\ a$ and are secured to the inclined floors P Q at each side of the pair of channel-beams $a$. Thus at the lower central interior portion of the car there is formed a substantial pocket or receptacle at each side of the longitudinal center of the car, two pockets thus being formed at each side of the transverse center of the car below the parallel beams $a$ $a$, said pockets being at opposite sides of the space provided for the mechanism operating the discharge-doors L L, which are duplicated at each side of the transverse center of the car and at each side of the longitudinal center of the car. The plates F', constituting the inner walls of the aforesaid pockets, correspond along their lower edges with the inclination of the floor-sections P Q, and at their inner upwardly-converging edges extend upward to and fit around the transverse beams $d$ $d$, as illustrated in Fig. 2. The space above and between the doors L L is closed within the car-body by means of the plates G' G', as illustrated in Fig. 2, which diverge downward and outward from one another and toward the hinges of the doors L. The invention is not limited to the method of supporting the plates G'; but these plates may be supported upon pieces of angle-iron, as shown in Fig. 2, and these pieces of angle-iron are riveted to the inner beams E and the outer sides of the beams $a$. The doors L L are of ordinary form and construction, being hinged at their upper edges and adapted to be drawn inward toward one another for the purpose of permitting the discharge of the contents of the car down the inclined floors P Q. The means for operating the doors L L may be of any suitable character, and the present invention is not limited to any special means for operating these doors. The doors L L are, as above described, hinged at their upper horizontal edges, and in accordance with the mechanism illustrated in the drawings said doors have pivotally secured adjacent to their lower portions the links H', which are secured to the lower ends of the pivoted levers I', extending downward from the longitudinal shaft J', and which shaft is adapted to be operated by hand by means of the handle-lever K'. Upon the shaft J' at each side of the car-body are secured the ratchet-wheel L' and rocking arm M'. (Shown more clearly in Fig. 3.) A pawl N' is provided at each side of the car to prevent the shaft J' from rotating except at the proper time, and the door mechanism at one side of the car is duplicated on the other side of the car. Upon the depression of the handle-lever K' at one side of the car to open the doors L at that side the motion will be communicated, through the arm M' and rod O', to the shaft J' at the opposite side of the car to open the doors L at said opposite side. When the pawl N' at one side of the car is by hand relieved from its ratchet, the like pawl at the opposite side of the car will be likewise relieved from its ratchet through the rod P'. The door-operating mechanism just above referred to is not claimed herein and may be omitted entirely, if desired, said rods extending from the door-operating mechanism at one side of the car to the duplicate door-operating mechanism at the other side of the car, so that the motion of one set of said mechanism will be communicated to the other set of said mechanism and the train hand at one side of the car be enabled to open the doors at both sides of the car at one operation. The lower ends of the lever-arms I' when in their lower position are directly in line with the ends of the hanger Q', which operates as a suitable backing for said levers I' and prevents the weight against the doors L L from forcing the latter open.

The foregoing description applies to the car illustrated in Figs. 1 to 9, inclusive, and is definite as to all of the parts of said car. The car constructed as above described is entirely durable in all of its parts, and the car is capable of withstanding several times more weight than could possibly be loaded into it. The sides of the car being formed of metal plate-sections H constitute girders which aid in supporting the load, and the truss $e$ also aids in supporting the load, the weight of the load being taken substantially from the floor-sections and sustained by the girders, beams, and truss. The upper and lower beams or chords D E, while of great strength in themselves, are strengthened and rendered absolutely safe by the plate-sections H connecting them and by the support they receive from the truss $e$. In Figs. 1 to 9, inclusive, the upper chords D are composed of parallel channel-beams and the lower chords E are parallel channel-beams; but the invention is not limited in every case to the employment of the pair of beams at the upper and also at the lower edges of the sides of the car. It is preferable to use the beams D E in pairs and to secure the plate-sections H between them. The plate-sections H at each side of the middle plate-section H extend downward below the lower chords E, as illustrated in Figs. 4 and 8$^a$, and said plate-sections are each in one integral piece; but, if preferred, those portions of the said plate-sections at each side of the middle plate-section which are above the lower chords or beams E may be in one piece and the portions thereof below the chords or beams E may be a separate piece, if preferred or found more convenient. The middle portions of the car-body are rendered entirely safe by trussing the same, and in the car shown in Figs. 1 to 9, inclusive, the truss $e$ serves to take the strain from the middle part of the car and distribute it toward the truck-frames. The beams or lower chords E and longitudinal beams $a$ $a$ are rendered practically indestructible from collapse or other cause by reason of the transverse beams $d$ $d$ and truss $e$. The car as a whole has been constructed with a view of having large carrying capacity and of being capable of withstanding all of the load that could be placed into it, the car being entirely capable of carrying all of the load that the axles or bridges over which the car might pass could possibly withstand. The car illustrated in Figs. 1 to 9, inclusive, is capable of carrying several times the load that the axles could bear. At any time it might be desired to discharge the contents of the car the doors L L are simply opened and the contents of the car permitted to slide down the floor-sections P Q, after which the doors L L are closed. The pipes for compressed air may be carried directly through the open space below the central longitudinal beams $a\ a$ and between the vertical plates F', which extend downward from the same at each side of the transverse center of the car to form the inner walls of the pockets at the lower portions of the floor-sections P Q, as indicated in Fig. 3. Below the upper portions of the floor-sections P Q is left abundant space to receive the compressed-air machinery or other machinery or appliances, the ends of the car-frame being open, while the sides of same are closed. As above described, the invention is not confined to any special means for operating the doors L L.

In Figs. 10, 11, and 12 I illustrate a modified form of the invention, in which $d'\ e'$ respectively denote the upper and lower chords of the frame of the car-body, $f'$ vertical channel-beams connecting said upper and lower chords, and $g'$ the members of a lattice-truss, also connecting said upper and lower chords $d'\ e'$ and serving to distribute the load and take the weight of same from the center of the car. In the modified form of the invention shown in Figs. 10 to 12, inclusive, the floor-sections P Q are substantially the same as the floor-sections shown in Fig. 4, and said floor-sections are provided with doors L L, as explained in connection with the construction shown in Fig. 4. The sides of the car illustrated in Figs. 10 to 12, inclusive, apart from the upper and lower chords $d'\ e'$, the beams $f'$ and said lattice-truss are formed of wood planking $h'$, which is used in this instance in lieu of the metal plates H. (Shown in Fig. 4.) Below the lower beams or chords $e'$ in Fig. 10 the pockets at the lower middle portions of the car are formed of metal plates $i'$, secured at their upper edges to the lower chords or beams $e'$, and being substantially of the form and construction shown in Fig. 4. Extending transversely across the car and below the chords or beams $e'$ are the channel-beams $j'$, corresponding substantially with the transverse beams $d$ of Fig. 4, and upon said beams $j'$, as more clearly shown in Figs. 11 and 12, are the channel-beams $k'\ k'$, to which the truss-sections $m'$ are secured, and which serve to sustain said transverse beams $j'$ and relieve the strain of the load. In the car shown in Figs. 10 to 12, inclusive, many of the parts correspond exactly with the parts of the car shown in Fig. 4, and these parts are not specifically referred to. The purpose of illustrating the car shown in Figs. 10 to 12, inclusive, is to illustrate a modification of the invention or a distinct form of car thought to be within the scope of the invention which employs the wooden sides $h'$ and makes use of a lattice-truss in lieu of the truss $e$. (Shown in Fig. 4.) In all of these cars one object is to prevent the collapse of the car at its center, and in Fig. 4 the truss $e$ effectually accomplishes this result, while in the car shown in Figs. 10 to 12, inclusive, the lattice-truss and the plates $i'$ prevent the breaking down of the car at its center. One danger with the use of steel cars is that the straining of the metal will not always be capable of being observed by the bending of the parts such as is the case with wooden cars, and hence to prevent sudden collapsing of the cars without notice is an object accomplished by the present invention, whose purpose is the production of a steel or metal car which will be practicably indestructible by any ordinary use, and which is so strengthened and sustained about its middle portions that any collapse of the car at said portions will be impossible.

What I claim as my invention, and desire to secure by Letters Patent, is—

1. In a car, the upper and lower beams or chords, the vertical beams intermediate said chords, the metal sides applied against said vertical beams and extending intermediate said chords, and the inner longitudinal beams extending lengthwise of said sides, combined with the inclined floor-sections extending downward toward one another at the middle portion of the car and having the discharge-doors; substantially as set forth.

2. In a car, the pair of parallel beams D constituting the upper chord of the side, the pair of parallel beams E constituting the lower chord of said side, the vertical beams F intermediate said chords, the metal plate-sections H secured to said chords, and the longitudinal beams G extending along the inner side of the sides of the car and secured thereto, combined with a truss for relieving the middle portions of the car from the weight of the load; substantially as set forth.

3. In a car, the upper and lower beams or chords outlining the edges of the sides of the car, the vertical beams intermediate said chords, and the sides secured to said chords and beams, combined with the parallel longitudinal beams $a$, $a$, extending lengthwise of the car intermediate the lower chords E, E, the transverse beams extending below said lower chords and said beams $a$, $a$, the longitudinal truss $e$, and the truss-rod $f$ which extend downward from the upper end of the truss $e$ and connect with said transverse beams to relieve the middle portions of the car from the strain of the load; substantially as set forth.

4. In a car, the upper and lower edge beams or chords, the longitudinal beams $a$, $a$, in line with said lower chords, and the transverse beams $d$, $d$, extending below said lower chords and said longitudinal beams $a$, $a$, combined with the truss connected with said transverse beams for relieving the middle portions of the car from strain, and the inclined floor-sections converging downward toward the middle portion of the car and having at opposite sides of the transverse center of the car the discharge-doors; substantially as set forth.

5. In a car, the upper and lower beams or chords, the vertical beams intermediate said chords, the metal sides applied against said vertical beams and extending intermediate said chords, and the inner longitudinal beams extending lengthwise of said sides, combined with the inclined floor-sections extending downward toward one another at the middle portion of the car and having the discharge-doors, and the wood planking intermediate said inner longitudinal beams and lining the metal sides of the car; substantially as set forth.

6. In a car the upper and lower beams or chords outlining the upper and lower edges of the car-body, the vertical beams intermediate said chords, and the sides applied to said vertical beams or chords, combined with the inclined floor-sections converging downward toward the middle portions of the car and composed of the metal plates and inner wood planking, the angle-irons applied to said sides and supporting said floor-sections, and the discharge-doors at opposite sides of the transverse center of the car; substantially as set forth.

7. The car, and the trucks, combined with the rub-irons $t$ carried by the car, the pawls $A'$ also carried by the car, the side bearing-rollers $w$ journaled upon the trucks and engaged by said rub-irons, and the ratchets $y$ rigid with said rollers and engaged by said pawls; substantially as set forth.

8. The car having the rolled beam upper and lower chords at its opposite sides, the rolled horizontal beams connecting said upper chords and said lower chords at the ends of the car, and the vertical rolled beams connecting said upper and lower chords, combined with the downwardly-converging floors supported between the sides of the car, the discharge-doors at the lower ends of said floors, the transverse bolster-beams over the car-trucks, and beams $a'$ intermediate said bolster-beams and the lower beams at the ends of the car; substantially as set forth.

9. The car having the rolled beam upper and lower chords at its opposite sides, the rolled horizontal beams connecting said upper chords, and said lower chords at the ends of the car, and the vertical rolled beams connecting said upper and lower chords, combined with the downwardly-converging floors supported between the sides of the car, the discharge-doors at the lower ends of said floors, and the outwardly-extending beams $E'$ connecting the lower side chords with the lower end beams of the car; substantially as set forth.

10. The car, having the upper and lower beam-chords, the inclined floors extending downward and inward below the lower chords, and the discharge-doors at the lower ends of said floors, combined with the parallel longitudinal beams intermediate said lower chords and extending through said floors, the central transverse bolster-beam below said lower chords and said longitudinal beams, the truss $e$ whose members diverge downward and outward and are secured between said longitudinal beams, and the truss-rods extending laterally downward and outward and secured at their lower ends to said transverse bolster-beam; substantially as set forth.

11. The car, having the upper and lower beam-chords, the inclined floors extending downward and inward below the lower chords, and the discharge-doors at the lower ends of said floors, combined with the longitudinal beam centrally intermediate said lower chords and extending through said floors, the transverse bolster-beam below said lower chords and said longitudinal intermediate beam, the plates $F'$ secured to said longitudinal intermediate beam and at their facing ends conformed to said bolster-beams, and a truss connected with said bolster-beams for distributing the strain of the load from the central portions of the car; substantially as set forth.

In testimony whereof I affix my signature in presence of two witnesses.

EDWARD A. TRAPP.

Witnesses:
CHAS. C. GILL,
E. JOS. BELKNAP.